Dec. 3, 1929.　　　R. McCLASKEY　　　1,738,074
POTATO DIGGER
Filed Feb. 29, 1928　　　5 Sheets-Sheet 1
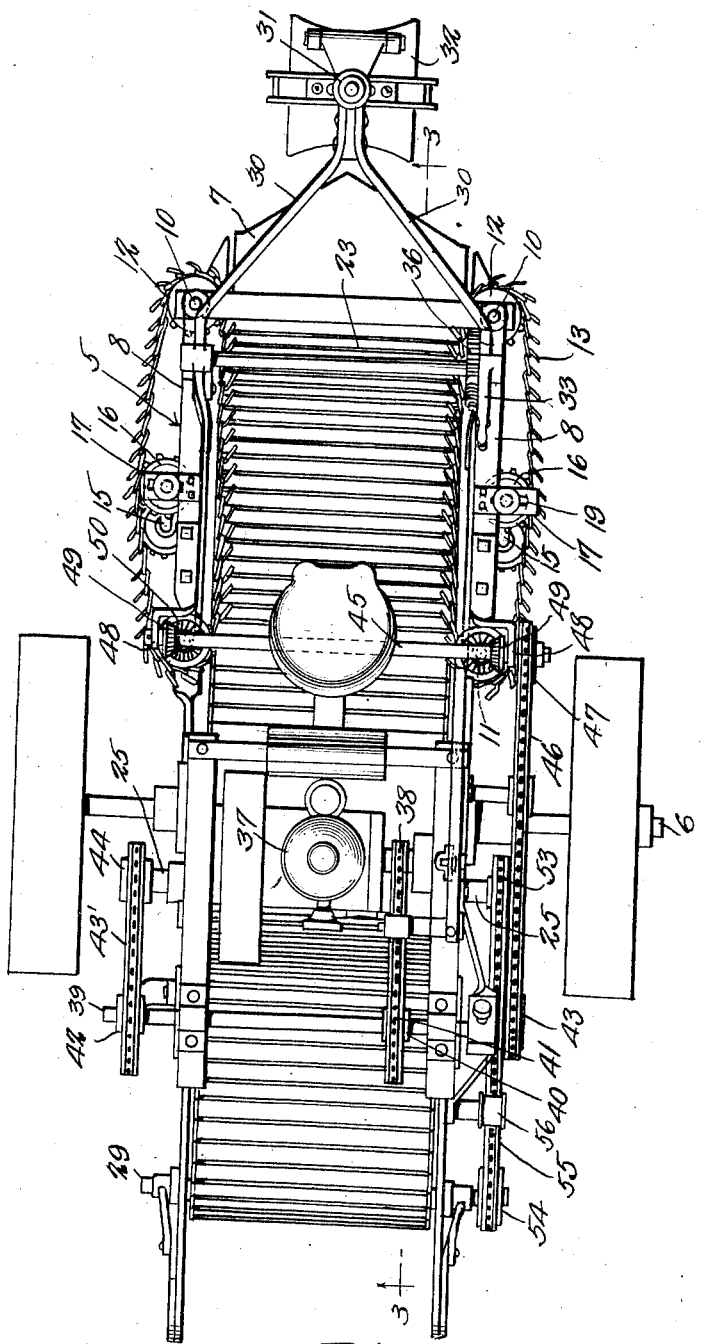
Riley McClaskey
Inventor
By C. A. Snow & Co.
Attorneys

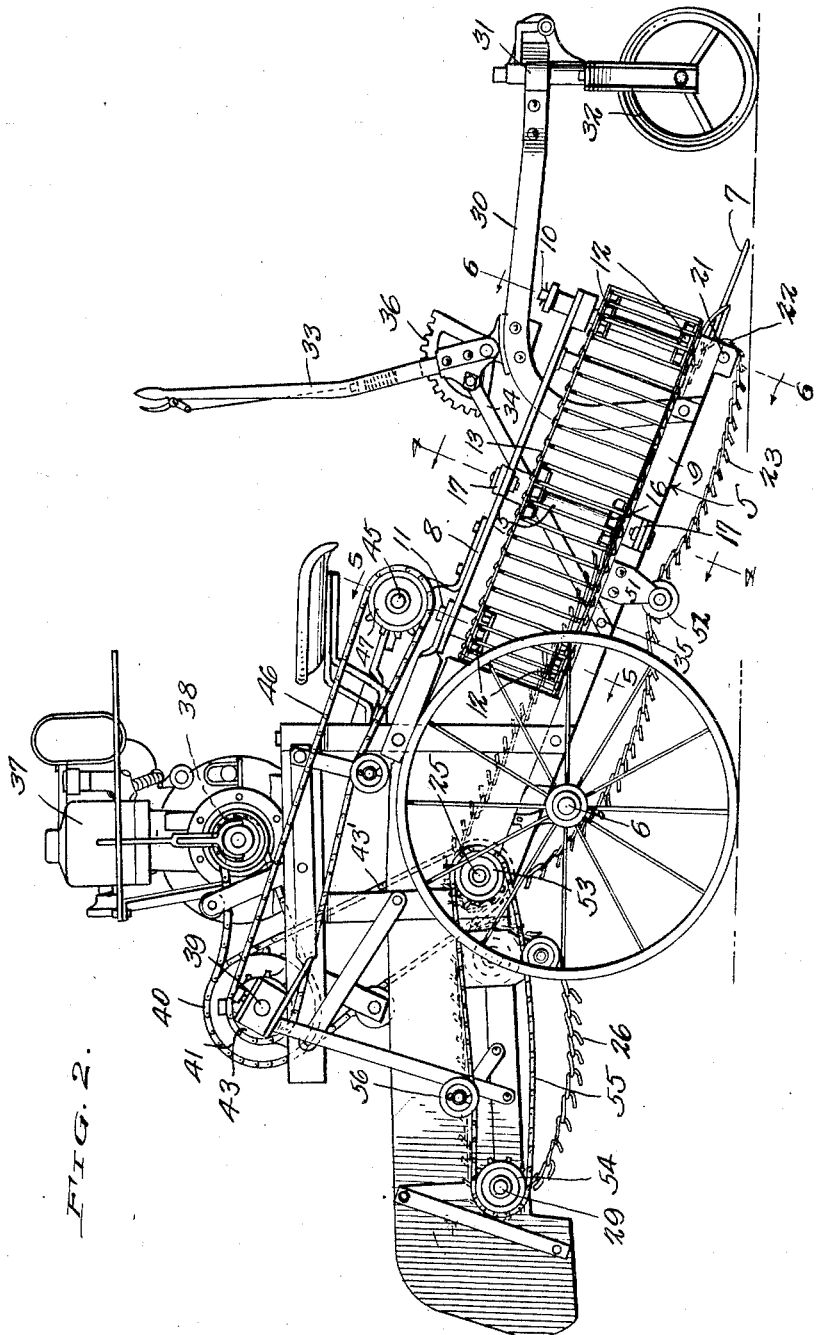

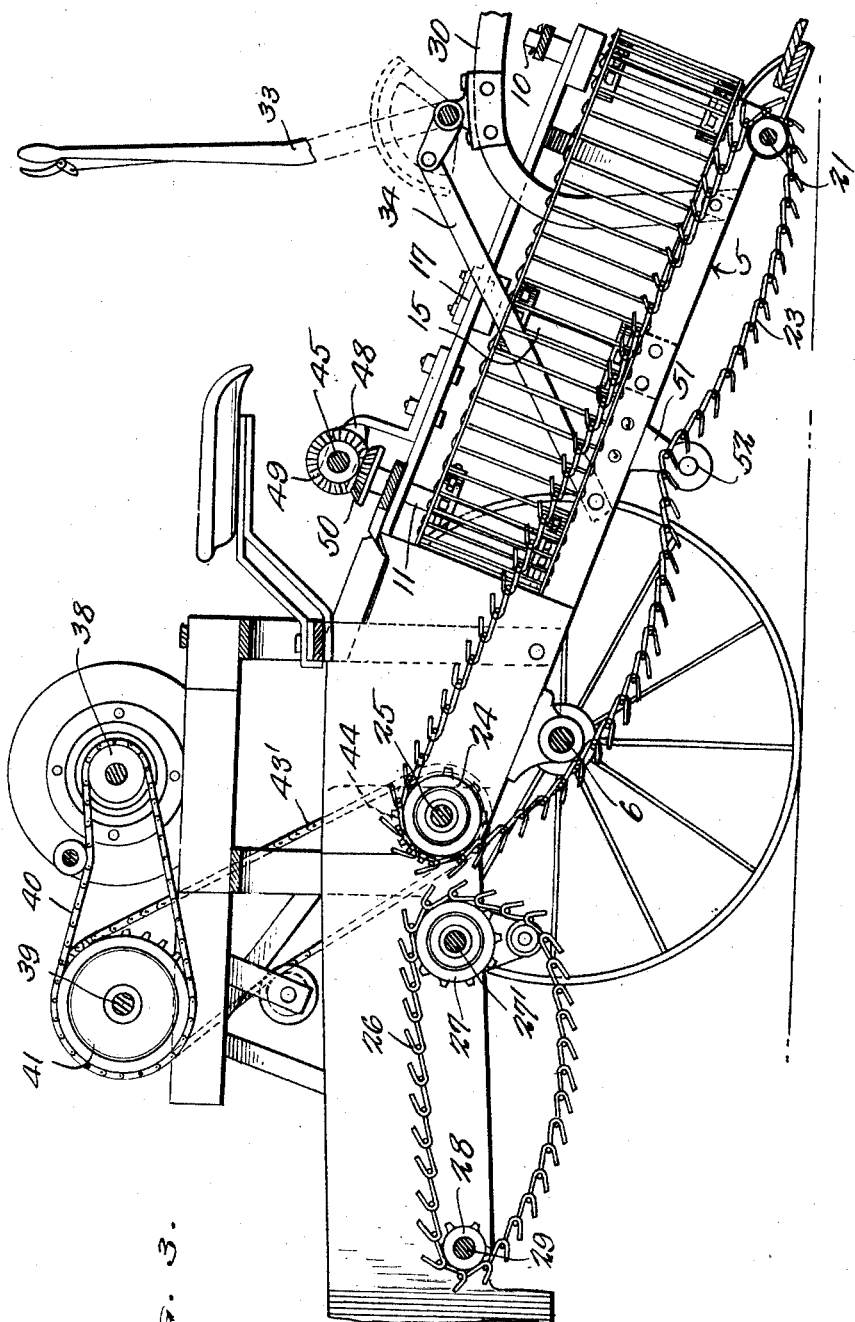

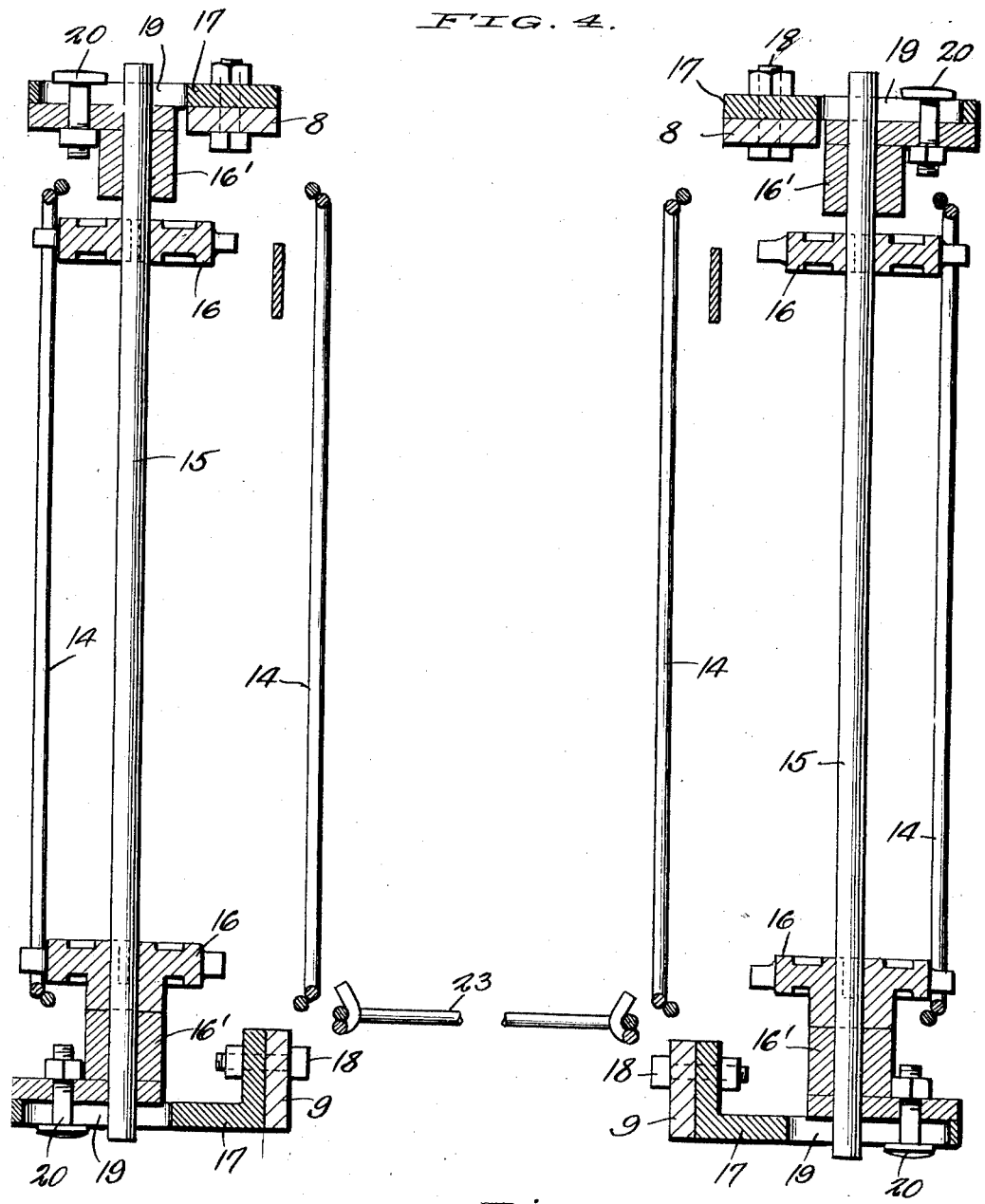

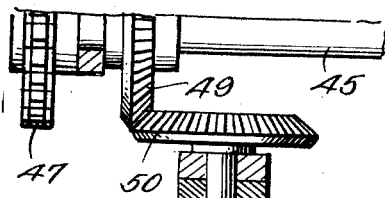
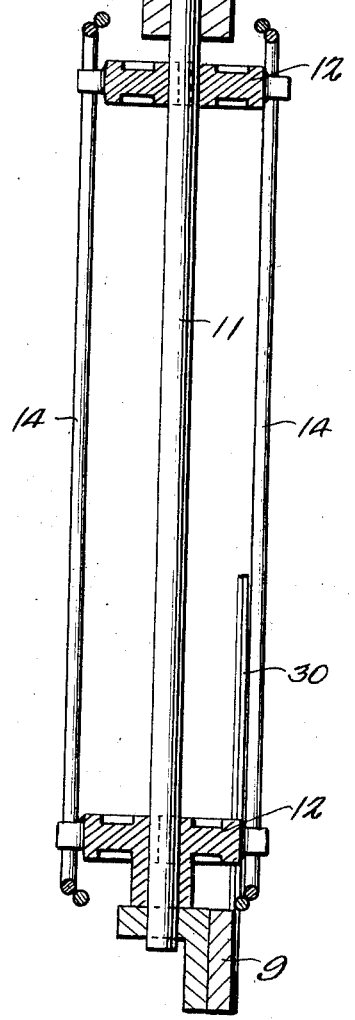
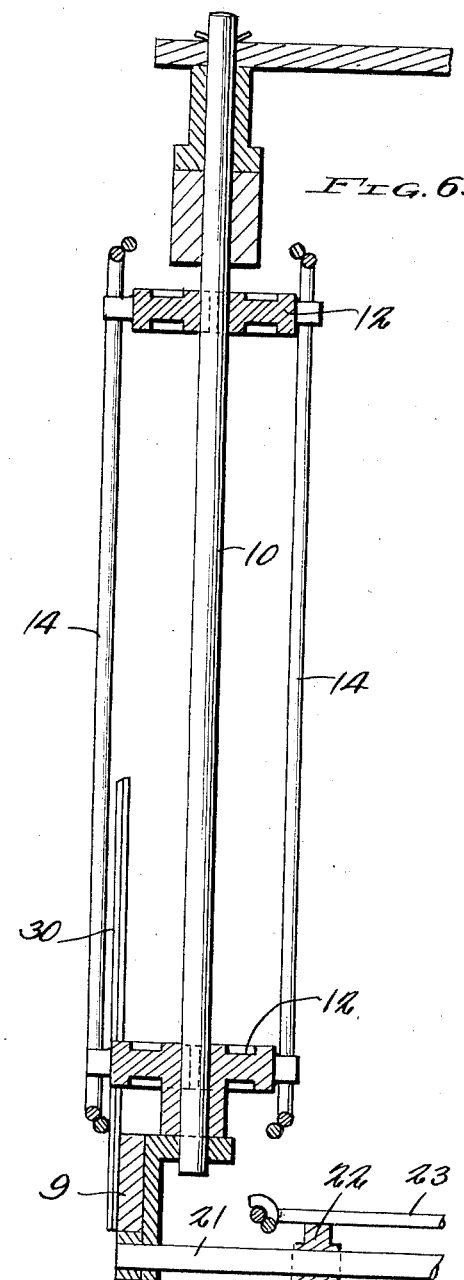

Patented Dec. 3, 1929

1,738,074

UNITED STATES PATENT OFFICE

RILEY McCLASKEY, OF IDAHO FALLS, IDAHO

POTATO DIGGER

Application filed February 29, 1928. Serial No. 258,003.

This invention relates to agricultural machines, and more particularly to machines especially designed for harvesting potatoes, beets, or the like and aims to provide novel means whereby the potatoes or vegetables harvested will be conveyed to the rear of the machine without danger of the vegetable being bruised, cut, or otherwise damaged during the harvesting operation.

An important object of the invention is to provide means to prevent the clogging of the vegetables at a point where they enter the conveyor thereby insuring against the loss of time required to relieve this clogged condition.

A still further object of the invention is the provision of means whereby the forward or pivoted section of the frame of the machine which carries the plow, may be raised and lowered to meet various requirements.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of an agricultural machine constructed in accordance with the invention.

Figure 2 is a side elevational view thereof.

Figure 3 is a longitudinal sectional view through the machine.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Referring to the drawings in detail, the machine embodies a wheel supported frame indicated generally by the reference character 5, the same being pivotally supported on the axle 6 so that it may be moved vertically to adjust the depth of operation of the plow 7 mounted at the forward end of the frame.

The frame includes pairs of bars, the bars of each pair being indicated by the reference characters 8 and 9 respectively, the pairs of bars being arranged at opposite sides of the frame as clearly shown by Figure 2 of the drawings. The bars of each pair are disposed in vertical spaced relation with each other and have vertical shafts 10 and 11 arranged at the ends thereof. Mounted on these shafts 10 and 11 are spaced sprocket wheels 12 over which the endless conveyors 13 operate, the endless conveyors embodying vertical rods 14 having their ends formed into hooks and interlocked to secure the rods or links together.

The hooked ends of the links are so constructed that when the endless conveyors are operating to move the vegetables towards the rear of the machine the ends extend laterally to catch the vegetables and carry them through the machine without danger of the vegetables clogging the mouth of the machine.

Positioned between the shafts 10 and 11 and arranged intermediate the ends thereof, are shafts 15 on which the sprockets 16 are mounted at points adjacent to the ends thereof, the sprockets being secured to the shafts to move therewith.

As clearly shown by Figure 4 these shafts have their ends operating in bearings 16' that in turn are supported by the plates 17 secured to the bars 8 and 9 by means of bolts 18, the plates 17 being provided with elongated openings 19 in which the bolts 20 are positioned, the bolts 20 also passing through the bearing members 16' to support the bearing members for lateral adjustment to the end that the endless conveyors may be tightened or loosened, at will.

Disposed adjacent to the forward end of the machine is a horizontally disposed shaft 21 on which are mounted sprockets 22 disposed adjacent to the ends thereof, over which sprockets the endless conveyor 23 operates, the endless conveyor also operating over sprockets 24 arranged at the end of the shaft 25 which operates at the opposite end of the main frame of the machine.

This conveyor 23 acts to receive the vegetables from the plow 7 and carry the vegetables to the rear of the machine where the vegetables are picked up by the conveyor 26 operating over the sprockets 27 and 28 arranged on the shafts 27' and 29 respectively.

At the forward end of the machine is a frame 30 embodying bars connected at their forward ends and supplied with a bearing 31 in which the caster wheel 32 is positioned, the rear ends of the bars of the frame 30 extending downwardly where they connect with the side bars of the main frame of the machine in a manner to permit of pivotal movement of the main frame with respect to the frame 30.

Pivotally mounted on the frame 30 is a lever 33 that has connection with the link 34 that in turn has pivotal connection with the main frame 35 there being provided a segmental rack 36 connected with the frame 30 so that the lever 33 may be operated to raise or lower the main frame of the machine and consequently adjust the plow 7 so that it may operate at various depths.

Power is applied to the machine by the motor 37, which is of the usual internal combustion engine type the same being supplied with a sprocket 38 or power sprocket that rotates shaft 39 through the medium of the chain 40 and sprocket 41 mounted on the shaft.

At the outer ends of the shaft 39 are sprockets 42 and 43 respectively the sprocket 42 being provided to impart rotary motion to the shaft 26, through the medium of the chain 43' and sprocket 44 mounted on the shaft 26.

The sprocket 43 transmits motion to the shaft 45 through the medium of the chain 46 and sprocket 47 mounted at one end of the shaft 45, the shaft 45 being shown as mounted in bearings 48 secured to the upper bars 8 of the pairs of bars that from the main frame of the machine.

Mounted at the ends of the shaft 45 are beveled pinions 49 that mesh with the beveled pinions 50 mounted at the upper ends of the shafts 11 to the end that rotary movement of the shaft 45 is imparted to the shafts 11, which in turn operate the endless conveyors that operate at the side of the main frame.

Supported under the main frame of the machine by means of the hangers 51 is a roller 52 over which the endless conveyor 23 operates, to relieve the links of the conveyor of the excessive strain of the weight of the conveyor as its sags under the frame.

The shaft 25 is provided with a sprocket wheel 53 at one end thereof, which sprocket transmits movement to the sprocket 54 mounted at one end of shaft 29, through the medium of the chain 55, there being provided an idle roller 56 resting on the chain to hold the chain taut at all times.

From the foregoing it will be obvious that due to this construction, the machine may be drawn over a field planted with potatoes or similar vegetables to be harvested, it being understood that the motor has been placed in operation to operate the various conveyors.

As the vegetables are removed by the plow, they are forced rearwardly by the conveyors where they are deposited at the rear of the machine.

The conveyors 13 will act to move the vegetables rearwardly as they pile up at the mouth of the machine, thereby preventing clogging of the machine which usually results in bruising the vegetables and rendering them unfit for use.

It is believed that in view of the foregoing description, a further description as to the operation of the machine is unnecessary.

I claim:

A potato digger including an inclined wheel supported frame, a plow at the forward end of the frame, an endless conveyor operating over the end of the frame, endless conveyors operating at the sides of the first mentioned endless conveyor, the sides of last mentioned conveyors operating in vertical planes, an endless conveyor operating in a horizontal plane, one end of the run of the last mentioned conveyor operating adjacent to the first mentioned conveyor to receive material therefrom, and means for adjusting the frame to regulate the depth of operation of the plow.

In testimony that I claim the foregoing as my own, I have hereto affixed my signature.

RILEY McCLASKEY.